US010108939B1

(12) United States Patent
Ritter et al.

(10) Patent No.: US 10,108,939 B1
(45) Date of Patent: Oct. 23, 2018

(54) PAYMENT TRANSACTION METHOD AND PAYMENT TRANSACTION SYSTEM

(75) Inventors: Rudolf Ritter, Zollikofen (CH); Georges Schlegel, Oberdorf (CH)

(73) Assignee: Swisscom AG, Bern (CH)

( * ) Notice: Subject to any disclaimer, the term of this patent is extended or adjusted under 35 U.S.C. 154(b) by 139 days.

(21) Appl. No.: 10/149,430

(22) PCT Filed: Dec. 23, 1999

(86) PCT No.: PCT/CH99/00622
§ 371 (c)(1),
(2), (4) Date: Jun. 24, 2002

(87) PCT Pub. No.: WO01/48714
PCT Pub. Date: Jul. 5, 2001

(51) Int. Cl.
*G06Q 20/08* (2012.01)
*G06Q 20/00* (2012.01)
*G06Q 20/20* (2012.01)

(52) U.S. Cl.
CPC .................................. *G06Q 20/08* (2013.01)

(58) Field of Classification Search
CPC ......................... G06Q 20/401; G06Q 20/425
USPC ..................................................... 705/39, 40
See application file for complete search history.

(56) References Cited

U.S. PATENT DOCUMENTS

| 5,440,634 | A | * | 8/1995 | Jones | G06Q 20/04 |
| | | | | | 235/379 |
| 5,862,222 | A | * | 1/1999 | Gunnarsson | B67D 7/0401 |
| | | | | | 340/5.42 |
| 5,986,565 | A | | 11/1999 | Isaka | |
| 6,016,476 | A | * | 1/2000 | Maes | G06Q 20/108 |
| | | | | | 705/18 |

FOREIGN PATENT DOCUMENTS

| EP | 1858240 B1 | * | 9/1996 | ............ G06Q 20/04 |
| WO | 98 11519 | | 3/1998 | |
| WO | 98 34203 | | 8/1998 | |
| WO | 98 37524 | | 8/1998 | |
| WO | WO 98/37524 | * | 8/1998 | ............... G07F 7/10 |
| WO | WO-9837524 A1 | * | 8/1998 | ............ G06Q 20/00 |

OTHER PUBLICATIONS

U.S. Appl. No. 10/168,387, filed Jun. 21, 2002, Pending.

* cited by examiner

*Primary Examiner* — Sarah M Monfeldt
*Assistant Examiner* — David P Sharvin
(74) *Attorney, Agent, or Firm* — McAndrews, Held & Malloy, LTD

(57) ABSTRACT

A payment transaction method between a customer with a portable mobile device and a service point includes determining, at a payment terminal of the service point, a total transaction amount to be paid and a transaction identification that is different from other transaction identifications used for other transactions and assigned to the total transaction amount. The method includes informing the customer about the total transaction amount and the transaction identification. The method includes transmitting, from the payment terminal, the total transaction amount and the transaction identification to a central transaction unit. The method includes transmitting, from the mobile device, the transaction identification without inclusion of the transaction amount to the central transaction unit. The method further includes transmitting from the central transaction unit a payment request including at least the total transaction amount to the mobile device.

14 Claims, 2 Drawing Sheets

Wl0,108,939 B1

PAYMENT TRANSACTION METHOD AND PAYMENT TRANSACTION SYSTEM

The present application is a national stage filing of PCT application PCT/CH99/00622, filed on Dec. 23, 1999, and is a continuation-in-part of application Ser. No. 09/462,117 filed on Dec. 23, 1999, now abandoned, which is the national stage filing of PCT/CH98/00086 filed on Mar. 5, 1998.

The present invention relates to a payment transaction method and a payment transaction system. In particular the present invention relates to a payment transaction method according to the preamble of the independent method claim 1 and to a payment transaction system for carrying out this payment transaction method.

Owing to the growing popularity and spread of mobile telephony, more and more customers of service points, so-called points of sale (POS), for example points of sale of products and/or services, are equipped with portable mobile devices, namely mobile radio telephones, which support the identification and authentication of a respective customer. Since non-cash modes of payment are being used more and more frequently for the payment of products and/or services at the service point and the customers are being provided with numerous different identification cards for this purpose by the various service points, there has been a desire to use the above-mentioned portable mobile devices for this purpose. Conventional mobile radio telephones comprise an identification module, a so-called SIM chipcard (Subscriber Identification Module) containing an unambiguous user identification, for instance an IMSI (International Mobile Subscriber Identity), by means of which the respective user can be identified in a telecommunication network. To prevent use of such a mobile device by an unauthorized user, a user first has to authenticate himself at the mobile device, for example by entering a personal code (Personal Identification Number, PIN) by means of the operating elements of the mobile device, which personal code is compared with a value stored on the SIM chipcard with the aid of security services.

Described in the patent application EP 708 547 A2 is the use of a mobile radio telephone as authenticated transaction controller. At a retail shop, according to the teaching disclosed in EP 708 547 A2, a customer first authenticates himself at his mobile radio telephone, for instance through entry of a personal identification code, then the shop manager and the customer agree upon a transaction password, which is entered by the customer into his mobile radio telephone and is transmitted in a wireless way, together with identification data, for example a device number and the telephone number of the mobile radio telephone, to a receiver of a payment terminal of the retail shop. According to the teaching disclosed in EP 708 547 A2, the respective monetary amount to be paid (which amount is either obtained by the payment terminal or entered by the customer in his mobile radio telephone and transmitted to the receiver of the payment terminal together with the transaction password and the identification data) and the identification data are transmitted to a credit center. The transaction password described in EP 708 547 A2 makes it possible in particular for the payment terminal to be able to assign the data transmitted from the mobile radio telephone to the respective transaction and not be interfered with by possible transmissions of other mobile radio telephones.

It is an object of the present invention to propose a new payment transaction method and a new payment transaction system which can be used in particular for service points with one or more payment terminals and with one or more customers equipped with mobile devices.

This object is achieved according to the present invention in particular through the features of the independent claims. Further advantageous embodiments follow moreover from the dependent claims and from the description.

This object is achieved in particular in that in the payment transactions between a customer with a portable mobile device, for example a mobile radio telephone or a communication-capable palmtop or laptop computer, and a service point with a plurality of payment terminals, in which payment transactions a payment terminal of the service point informs the customer about a total transaction amount to be paid and a transaction identification assigned to this total transaction amount, and the customer indicates the transaction identification to the mobile device, the mobile device transmits the transaction identification indicated by the customer via a mobile radio network, for example a GSM or a UMTS network or another, e.g. satellite-based, mobile radio network, to a central transaction unit, the payment terminal transmits the total transaction amount and the transaction identification via a communication network, for instance an above-mentioned mobile radio network or a fixed network, to this central transaction unit, and the central transaction unit transmits a payment request comprising at least the total transaction amount and for instance the transaction identification, via the mobile radio network to the mobile device from which mobile device the transaction identification was transmitted.

Thus in the payment transaction method and payment transaction system according to the invention, a payment transaction between a customer with a portable mobile device and a service point, for example a so-called point of sale (POS), with a plurality of payment terminals, is carried out in two phases. In the first phase, in which the transaction identification is determined by the payment terminal, is made known, is indicated by the customer to his mobile device, and is transmitted by the mobile device as well as by the payment terminal to the central transaction unit, the payment terminal taking part in the respective payment transaction and the mobile device taking part in the respective payment transaction are assigned to one another in the central transaction unit. No direct communication takes place thereby between the payment terminal and the mobile device, which has the advantage that neither the mobile device nor the payment terminal have to be equipped with additional corresponding means, for example a standardized contactless device interface with transmitter and receiver at the mobile device and at the payment terminal, and that at the service point mobile devices and/or payment terminals which are not participating in a respective payment transaction are not included erroneously in the contactless information exchange for the respective payment transaction. Then, in the second phase, the financial aspect of the payment transaction between the payment transaction partners can be carried out, whereby, in this phase too, no direct communication takes place between the payment terminal and the mobile device since the financial aspect of the payment transaction is also dealt with via the central transaction unit. The second phase is initiated by the central transaction unit in that the payment request for the payment transaction is transmitted to the mobile device taking part in the respective payment transaction.

After the payment request has been accepted by the respective customer by means of operating elements of the mobile device, a payment record, comprising a linking of the payment request to a customer identification for the customer, is preferably prepared in the mobile device and transmitted from the mobile device via the mobile radio network to the central transaction unit. The payment record is provided with an electronic signature of the customer, for example, or is implemented as a secured certificate. The central transaction unit, for example a communications server, can further process the payment record or forward it e.g. to a financial institution or a clearing point. Preferably, after receipt of the payment record, the central transaction unit transmits a transaction confirmation, comprising at least the transaction identification, via the communication network to the payment terminal and, depending upon the embodiment, also to the mobile device.

When determining the transaction identification, the payment terminal preferably inserts a payment terminal identification into the transaction identification, which payment terminal identification makes, it possible to identify the respective payment terminal from among a plurality of payment terminals present at the service point. A payment terminal identification as a component of the transaction identification has the advantage moreover that at a service point with a plurality of payment terminals an unambiguous transaction identification can be determined in each case by, the respective payment terminal without further coordination with other units, for instance a central unit or the other payment terminals.

When determining the transaction identification, the payment terminal preferably inserts a service point identification into the transaction identification, and the total transaction amount is credited to the service point identified through the service point identification. A service point identification as a component of the transaction identification has moreover the advantage that payment transactions can be concluded by a multiplicity of service points via the central transaction unit, the service points being able to be assigned to different owners, for example, or respectively different service point operators.

In an embodiment variant, in the mobile device, before transmission of the payment record to the central transaction unit, indications about the mode of payment are inserted into the payment record, for instance debiting to a particular credit card number, debiting to a particular customer account, debiting to a particular bank account, or debiting against a prepaid monetary sum stored in the mobile device, for instance on the SIM card of the mobile device. The insertion of indications about the intended mode of payment has the advantage that the flexibility of the payment transaction method and the payment transaction system according to the invention is thereby increased and, depending upon the type of desired payment mode, at least certain payment transactions can be posted directly (online) and automatically, whereas others can be entered subsequently (off-line), for example with the aid of a clearing point suitable therefor.

In an embodiment variant, the payment terminal transmits the transaction identification additionally via a contactless device interface to the mobile device directly, and the customer indicates the transaction identification to the mobile device by accepting, by means of operating elements of the mobile device, the transaction identification received directly from the payment terminal via the contactless device interface. The advantage of this embodiment variant is that the customer does not have to type the transaction identification manually into the mobile device, so entry errors by the customer can be prevented and tedious data input avoided. The contactless device interface used for this embodiment variant can be implemented in simple form since, in a minimal variant, it need only be unidirectional, i.e. the payment terminal in the minimal variant needs only to be equipped with a suitable transmitter for transmitting the transaction identification, for instance a transmitter for transmitting radio and/or infrared waves, and the mobile devices, in the minimal variant, only have to be equipped with a suitable receiver for receiving the transaction identification, for example a receiver for receiving radio or infrared waves. One skilled in the art will understand that for achieving this embodiment variant no complex communications protocols have to be carried out, which would have to be carried out with a direct bidirectional communication between the mobile device and the payment terminal. Through these embodiment variants it is made possible for customers with mobile devices having means for receiving the transaction identification from the payment terminal via a contactless device interface not to have to type in the transaction identification manually, while customers with mobile devices without such means are not excluded from the proposed method, since they can type the transaction identification manually into the mobile device.

In an embodiment variant, the customer authenticates himself at his mobile device for example with a biometric feature, e.g. a fingerprint, a voice pattern or an eye pattern. The use of biometric features for authentication of a user has the advantage that the security entailed therewith is higher than with the use of a personal code, which can be guessed by unauthorized users, for instance, or forgotten by the authorized user.

In an embodiment variant, the solvency of the customer identified through the transmitted customer identification is checked by the central transaction unit. Based on the result of this solvency check, the central transaction unit can transmit a message to the respective payment terminal as well as to the respective mobile device by means of which message payment of the payment transaction by means of the inventive method is refused for the respective customer owing to lack of solvency, if applicable.

In an embodiment variant, the payment record and/or a transaction confirmation from the central transaction unit regarding the successfully made payment transaction is stored in the mobile device, for example on the SIM card of the mobile device. The advantage of storing payment records and/or transaction confirmations in the mobile device is that it is thereby made possible for the customer to keep track of payment transactions carried out and to use as a receipt a payment record, or respectively a transaction confirmation, stored in the mobile device, in particular when the payment request and/or the transaction confirmation contained in the payment record contains a certificate or an electronic signature of the respective service point and/or central transaction unit.

An embodiment of the present invention will described in the following with reference to an example. The example of the embodiment is illustrated by the following attached figures.

Figure 1:
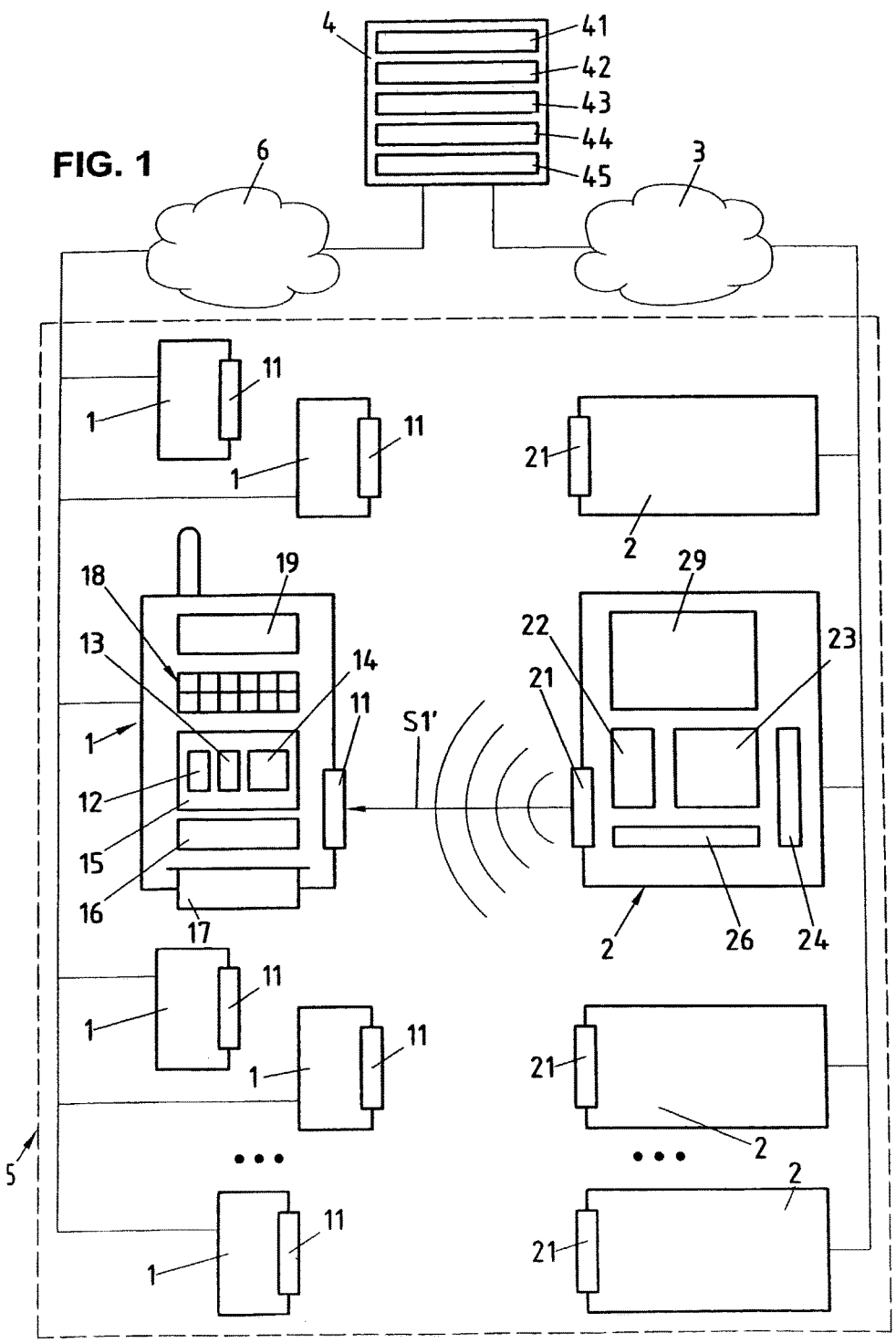
FIG. 1 shows a block diagram illustrating schematically a service point at which a plurality of mobile devices and a plurality of payment terminals are located, the mobile devices being connected via a mobile radio network and the payment terminals via a communication network to a central transaction unit.
Figure 2:
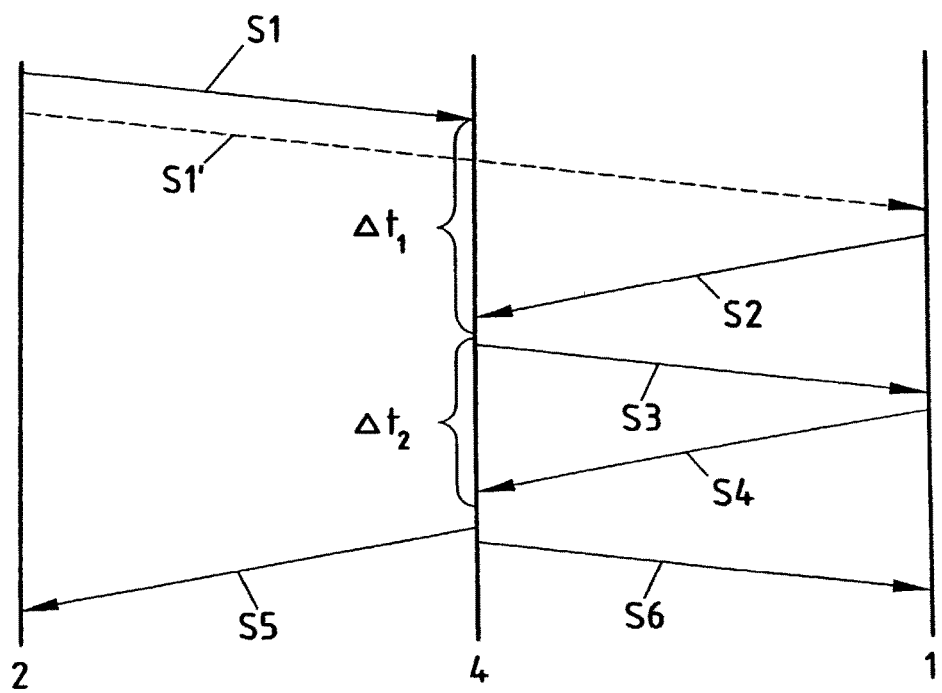
FIG. 2 shows a time diagram illustrating a possible sequential course of the information flow between a payment terminal, a central transaction unit and a mobile device.

In FIGS. 1 and 2, elements designated by a same reference symbol are to be considered as equivalent elements. In FIG. 1, the reference numeral 5 refers to a service point, a so-called point of sale (POS), for example a point of sale of products and services accessible to the public. As illustrated in FIG. 1, located at the service point 5 are a plurality of payment terminals 2 and a plurality of mobile devices 1 carried by customers.

The portable mobile devices 1 are, for example, mobile radio telephones, laptop or palmtop computers or other suitable portable mobile devices which are able to communicate via a mobile radio network 6, for instance a GSM or UMTS network or another, e.g. satellite-based, mobile radio network, i.e. in particular are able to exchange data. The exchange of data over the mobile radio network 6 can take place, for example, by means of special messages, for instance SMS (Short Message Service) or USSD messages (Unstructured Supplementary Services Data), or by means of special data services, for instance GPRS (Generalized Packet Radio Service) or HSCSD (High Speed Circuit Switched Data).

The term "software module" used in the present description refers in each case to a program code stored in a memory and executed on a processor, for instance in co-operation with suitable operational systems and/or with the aid of services of virtual platforms, e.g. a Java Virtual Machine (Java is a registered trademark of Sun Microsystems), so that the processor is controlled in such a way that it executes the respective functions assigned to the software module. One skilled in the art will understand that the programming language used for implementation of the software module does not change the substance of the present invention, but that the use of certain programming languages, for example Java or another object-oriented and platform-independent programming language, could certainly have known advantages known to one skilled in the art. The software modules can be assigned functions, for the execution of which a particular software module uses, as an aid, functions and/or services located in other modules, in one embodiment, e.g. for reasons of efficiency, but which functions are nevertheless to be understood as functional components of the respective software module.

The payment terminals 2 are based, for example, on conventional electronic cashier systems equipped, for example, with operating elements and price registering components, e.g. laser scanners, that are not shown, and comprise at least one processor 26. The payment terminals 2 comprise a transaction identification module 22, implemented, for example, as a programmed software module, which determines a transaction identification for a payment transaction. This transaction identification preferably contains at least one payment terminal identification (which makes it possible to determine a respective payment terminal 2 from among the plurality of payment terminals 2 present at the service point 5), a service point identification, as well as a transaction number which can be increased continuously by increments for each new payment transaction and/or comprise a date/time indication. The payment terminal identification is, for example, a number, for instance "12", a sequence of letters, for instance "BE" or a mixed sequence of letters and numbers, for instance "K3", which, as a rule, can be limited to two, or three digits, or respectively letters, in order to ensure an unambiguous identification of a payment terminal 2 at a service point 5. The number of numerical digits or letters of the service point identification depends upon how many service points 5 carry out their payment transactions via the central transaction unit 4. The service point identification can be structured in such a way, for example, that it comprises an allocating authority identification which identifies the allocating authority that has assigned the service point identification to the respective service point 5, for example the operator of a chain of service points 5, and comprises an unambiguous number for this allocating authority. The service point identification can also be foreseen for international use and comprise, for instance, country identifications and/or other suitable data elements. The number of numerical digits and/or letters of the transaction number depends upon how many payment transactions are carried out in a predefined time interval, for instance a day or half a day, via a payment terminal 2.

One skilled in the art will understand that the service point identification and the payment terminal identification can also be replaced by an unambiguous combined payment terminal identification. However, resulting therefrom is a transaction identification which is not suitable for simple typing into the mobile device 1 owing to the number of necessary digits. Furthermore a centralized administration of transaction identifications would thereby be required.

The transaction identification determined for a payment transaction is shown by the payment terminal 2, for example a transaction identification module 22 or another programmed software module of the payment terminal 2, on a display 29 of the payment terminal 2 together with the total transaction amount, determined by the payment terminal 2, for this payment transaction to be paid by the customer. The respective customer is thereby informed about the total transaction amount and the transaction identification for the payment transaction.

The payment terminal 2 comprises a transaction placing module 23, for example a programmed software module, which transmits the transaction identification and the total transaction amount for the respective payment transaction via a communication network 3 to the central transaction unit 4, as is indicated by the arrow S1 in FIG. 2. This transmission takes place automatically, for example, or after entry of a corresponding command in the payment terminal 2 by employees of the service point 5, or, in a further variant, not until after the payment terminal 2 has been requested to do so by the central transaction unit 4. The communication network 3 is, for example, a fixed network, for instance the public switched telephone network, an ISDN network, an Internet network, or a LAN (Local Area Network) or WAN (Wide Area Network), or a mobile radio network, for example a GSM or a UMTS network, or another, e.g. satellite-based, mobile radio network.

If the customer would like to pay the total amount of the payment transaction by means of his mobile device1, he switches on his mobile device1, and, in an embodiment variant, is requested by a authentication module 12 of the mobile device 1, for instance a programmed software module, to authenticate himself for security reasons. The customer is asked to enter a personal identification code (Personal Identification Number, PIN), for example, which is received by the authentication module 12 and is compared with a code stored in a secured way in the mobile device 1, for instance on a SIM card 17 (Subscriber Identification Module) of the mobile device 1. In a variant, the authentication module 12 has available additionally hardware components and further software components to receive a biometric feature of the customer for authentication and to compare it to a biometric feature stored beforehand in a secured way in the mobile device 1, for instance on a SIM card 17 of the mobile device 1. The biometric feature is, for example, a voice pattern, which has been recorded by means of a microphone of the mobile device 1, a fingerprint or facial features recorded with a video sensor of the mobile device 1, or an eye pattern, e.g. a pattern of the iris or retina, which has been registered with a suitable scanner.

If applicable, following a successful authentication, the customer selects by means of operating elements 18 on his mobile device 1 the function "payment transaction" from a menu of functions shown on the display 19 of the mobile device 1. The menu and function execution control is implemented, for example, through a programmed software module of the mobile device 1, e.g. through a Java applet, which is stored, for instance, on the SIM card 17 of the mobile device 1. For reasons of security, the software module(s) can be blocked from carrying out the function "payment transaction", for instance by a responsible operator via the mobile radio network 6 or via a contactless device interface 21-11, for example in that a signed or certified command word is transmitted to the mobile device 1 by means of suitable messages, where it is processed by a corresponding software module.

After selection of the function for the payment transaction, the user is requested by the transaction response module 13 of the mobile device 1, for example a programmed software module, to enter the transaction identification for the respective payment transaction. The customer can type in the transaction identification, for example using the operating elements 18 of the mobile device 1. If the mobile device 1 has a suitable speech recognition module, the customer can also indicate the transaction identification to the mobile device 1 by means of spoken language. In a variant, to prevent entry errors, the mobile device 1 can receive the transaction identification for the respective payment transaction from the respective payment terminal 2 via the contactless device interface 21-11, for example, by means of the transaction response module 13 of the mobile device 1, for instance, as indicated by the arrow S1 of broken lines in FIG. 2, and display it on the display 19 of the mobile device 1, so that the customer can indicate to the mobile device 1 the transaction identification for the respective payment transaction by accepting the displayed transaction identification by means of the operating elements 18 of the mobile device 1.

In a minimal variant of this last embodiment variant, the payment terminal 2 is equipped with at least one transmitter 21 of the contactless interface 21-11. The transmitter 21 comprises the necessary hardware elements to transmit data, for instance in the form of radio or infrared waves, and to connect the transmitter to the processor 26 of the payment terminal 2, as well as the programmed software modules and software interfaces needed for operating and controlling the transmitter 21. For this minimal variant, the mobile device 1 is equipped with a corresponding receiver 11 having the necessary hardware elements and software modules to receive data via the contactless interface 21-11 and to forward it to the processor 16 of the mobile device 1 (the receiver 11 can also be the mobile radio receiver of the mobile radio device 1, for instance). In this minimal variant, the payment terminal 2 can transmit the transaction identification repeatedly, for instance periodically, for example during a predefined time interval, or until the payment transaction is concluded for the payment terminal 2, whereby the transmitting power of the transmitter 21 is selected in such a way that the transaction identification can be received only in the narrower range around the payment terminal 2 and is not received in an unnecessary way by other mobile devices 1 at the service point 5.

One skilled in the art will understand that the payment terminal 2, or respectively the mobile device 1, can each be equipped with transmitters and receivers for a bidirectional contactless interface, this bidirectional contactless interface, for example, also being able to be used in unidirectional operation, for reasons of compatibility, for instance. Such bidirectional contactless device interfaces are, for example, infrared interfaces, e.g. High Speed Infrared (HSIR) interfaces or IrDA interfaces (Infrared Data Association), inductive interfaces, for instance Radio Frequency Identification (RFID) interfaces, Home RF (Radio Frequency) interfaces, Digital European Cordless Telecommunications (DECT) interfaces or other Cordless Telecommunications System (CTS) interfaces, or high frequency radio interfaces, in particular so-called Bluetooth interfaces, which work e.g. at 2.4 GHz and were described, for example, on the Internet on the page www.bluetooth.com at the time of filing of the present application.

The transaction response module 13 of the mobile device 1 transmits the transaction identification indicated by the customer via the mobile radio network 6 to the central transaction unit 4, as indicated by the arrow S2 in FIG. 2. The central transaction unit 4 is based, for example, on a conventional communications server, i.e. a computer set up as a server with suitable operations systems and database systems, data stores and a communications module 45. The central transaction unit 4 can also be achieved with a plurality of computers linked to one another. It should be pointed out here that the connection of the central transaction unit 4 to the mobile radio network 6 has been shown only schematically in FIG. 1 and that this connection takes place in a known way, for example via a fixed network connection and via an exchange, in particular a Mobile Switching Centre (MSC). The mobile devices 1 can also communicate via the Internet with the central transaction unit 4, for example by means of WAP (Wireless Application Protocol), suitable Java applets (Java is a registered trademark of Sun Microsystems) and/or SIM Toolkit functions.

In the central transaction unit 4, the transaction identification transmitted by the payment terminal 2 and the assigned total transaction amount are received by means of the communications module 45 and are temporarily stored, as indicated in FIG. 2 by the arrow S1. The communications module 45 comprises, for example, a software module as well as the necessary hardware components to communicate via the mobile radio network 6 as well as via the communication network 3, i.e. in particular to exchange data with the mobile devices 1 and the payment terminals 2 via these networks. The transaction identification transmitted by the mobile device 1 is also received in the central transaction unit 4 by means of the communications module 45, as indicated by the arrow S2 in FIG. 2. The communications module 45 thereby additionally determines in a known way the call number of the mobile device 1 which has transmitted the transaction identification, for instance the MSISDN number (Mobile Subscriber ISDN), and stores this call number, assigned to the transaction identification received from the mobile device 1, in the central transaction unit 4.

As illustrated in FIG. 2, the central transaction unit 4 expects for a respective payment transaction the transmission of the transaction identification from the mobile device 1, as indicated by the arrow S2, within a predefined time interval $\Delta t_1$ after the central transaction unit 4 has received the transmission of the total transaction amount and of the transaction identification from the payment terminal 2 as indicated by the arrow S1. Otherwise a time error will be registered in the central transaction unit 4 and the further processing of the payment transaction discontinued, for example after corresponding notification of the payment terminal 2. As already explained in connection with the transaction placing module 23, the time sequence of the arrows S1 and S2 illustrated in FIG. 2 can also be reversed in that namely the payment terminal 2 does not carry out the transmission of the transaction identification and of the total transaction amount to the central transaction unit 4, as indicated by the arrow S1, until it has been requested to do so by the central transaction unit 4, the central transaction unit 4 being able to initiate such a request on the basis of the transaction identification, containing in particular the payment terminal identification, transmitted from the mobile device 1 to the central transaction unit 4 according to the arrow S2 (the predefined time interval $\Delta t_1$ is correspondingly started by the arrow S2).

The central transaction unit 4 comprises a payment request module 42, for example a programmed software module which compares the transaction identification received from the mobile device 1 with temporarily stored transaction identifications that have been received from payment terminals 2. In the case of a match, the payment request module 42 prepares a payment request comprising at least the matching transaction identification as well as the total transaction amount assigned to this transaction identification. As indicated by the arrow S3 in FIG. 2, the prepared payment request is transmitted by the payment request module 42 of the central transaction unit 4, with the aid of the communication module 45, via the mobile radio network 6 to the mobile device 1 with the determined call number. Otherwise, if the payment request module 42 cannot identify any matching-transaction identifications, a corresponding error message is transmitted by the central transaction unit 4 to the mobile device 1, for instance with the request to enter the transaction identification again. It should be mentioned here that, to increase security, in particular to determine the authenticity of the central transaction unit 4, the payment request is executed by the payment request module 42 in a way provided with an electronic signature of the central transaction unit 4 or as a secured certificate.

The payment request transmitted from the central transaction unit 4 over the mobile radio network 6 is received in the respective mobile device 1, and, in a variant, is filtered based on the transaction identification contained therein in that the transaction identification received in the payment request is compared by the mobile device 1 with the transaction identification transmitted beforehand to the central transaction unit 4. In a payment record module 14 of the mobile device 1, for example a programmed software module, a payment record is prepared based on the received payment request, for instance after the authenticity of the payment request, or respectively the authenticity of the central transaction unit 4, has been checked and the payment request has been shown to the customer on the display 19 of the mobile device 1 and the customer has accepted and thereby enabled the payment by means of the operating elements 18 of the mobile device 1. The prepared payment record comprises the received payment request and a customer identification for the customer, for instance an IMSI (International Mobile Subscriber Identity) or a special user number assigned for this payment mode described here, which are stored in each case on the SIM card 17 of the mobile device 1. For improvement of the security, the payment record can be provided by the payment record module 14 with an electronic signature of the respective customer or can be executed as a secured certificate. The payment record can also be provided with a time/date indication.

The payment record module 14 preferably inserts in the payment record moreover indications about the desired mode of payment, which indications are stored, for example, as a default value in the SIM card 17 of the mobile device 1 or are requested by the respective customer via the display 19 of the mobile device 1 and are accepted via the operating elements 18. The indications about the desired mode of payment specify, for example, a desired debiting of the total transaction amount to a particular credit card number, a debiting to a particular customer account, a debiting to a particular bank account or a debiting against a prepaid monetary amount stored in the mobile device, for instance on the SIM card 17 of the mobile device 1. The payment record module 14 of the mobile device 1 transmits the prepared payment record, as indicated by the arrow S4 in FIG. 2, via the mobile radio network 6 to the central transaction unit 4.

As is illustrated in FIG. 2, the central transaction unit 4 expects for a respective payment transaction the transmission of the payment record from the mobile device 1, as indicated by the arrow S4, within a predefined time interval $\Delta t_2$ after the central transaction unit 4 has effected transmission of the payment request to the mobile device 1, as indicated by the arrow S3. Otherwise a time error will be registered in the central transaction unit 4, and the transmission indicated by the arrow S3, carried out again, for example, and possibly, e.g. in the case of repeated failure, the further processing of the payment transaction discontinued, for example after corresponding notification, of the payment terminal 2.

The payment record is received in the central transaction unit 4, for example by the payment request module 42, and, if applicable, the authenticity of the customer is checked on the basis of the electronic signature, or respectively of the certificate. In an embodiment variant, on the basis of the customer identification transmitted in the payment record, the central transaction unit 4 checks the solvency of the customer identified through the customer identification by means of the solvency checking module 43, which is implemented e.g. as a programmed software module. The solvency checking module 43 thereby has access, e.g. directly or via suitable services, to a corresponding database, the content of which is administered e.g. by a communication network operator, for instance the operator of the mobile radio network 6, or by a financial institution. In the case of a negative result of the solvency check, or respectively of the authenticity check, the central transaction unit 4 can transmit, if applicable, a negative transaction confirmation to the respective mobile device 1 as well as to the payment terminal 2 participating in the respective payment transaction, for instance through the transaction confirmation module 44, which is implemented e.g. as a programmed software module, by means of which negative transaction confirmation the customer is refused payment of the payment transaction via the method according to the invention, owing to lack of solvency. In the case of a positive result of the solvency check and/or of the authenticity check, the transaction confirmation module 44 of the central transaction unit 4 transmits a positive transaction confirmation to the payment terminal 2 taking part in the respective payment transaction and to the respective mobile device 1. The transaction confirmations contain at least the transaction identification for the respective payment transaction as well as an indication as to whether involved is a positive or a negative transaction confirmation, the respective reasons being given in the latter case, for example the above-mentioned time error, lack of solvency or non-confirmed authenticity of the respective customer. In the case of a positive transaction confirmation, the payment transaction is considered effected for the payment terminal 2 and for the mobile device 1, or respectively for the particular customer, and the purchased products and/or services can be released to the customer at the service point 5. One skilled in the art will understand that, for example, the positive transaction confirmation is not transmitted by the central transaction unit 4 to the transaction partners taking part in the respective payment transaction until the further processing, described below, of the payment record has been completed by the central transaction unit 4. The transmission of the transaction confirmation by the central transaction unit 4 to the payment terminal 2 is indicated by the arrow S5 in FIG. 2 and the transmission of the transaction confirmation by the central transaction unit 4 to the mobile device 1 is indicated by the arrow S6 in FIG. 2. In particular, positive transaction confirmations can be also be transmitted by the central transaction unit 4 by means of email, fax or letter mail to a predefined email address, fax number or respectively postal address of the respective customer and/or (of the operator) of the service point 5.

Preferably, the payment records and/or the positive transaction confirmations are stored in a memory 15 of the mobile device 1, for example by the payment record module 14, e.g. on a SIM card 17 of the mobile device 1, so that they can be used later as a receipt and/or are available to the respective customer for administration of the payment transactions made by him. If transaction confirmations are used for bookkeeping purposes or as receipts by the service point 5, or respectively its operator, and the customer, for instance in the mobile device 1, they additionally contain at least the total transaction amount for the respective payment transaction, preferably however also further indications mentioned above which are contained in the payment record for the respective payment transaction, in particular signatures, or respectively certificates of the participating transaction partners.

In the case of a positive result of the solvency check and/or of the authenticity check, if applicable, the payment record is further processed in the central transaction unit 4, taking into account the data contained therein about the customer's desired mode of payment, if applicable. By means of the communication module 45, the payment records can be forwarded to a financial institution or to a clearing point, for example over the communication network 3, or the total transaction amount can be deducted directly by the central transaction unit 4 via the mobile network 6 from a prepaid monetary amount stored in the mobile device 1, e.g. in the SIM card 17 of the mobile device 1. On the basis of a service point identification, contained in the transaction identification, the total transaction amount can be credited to the service point 5 by the central transaction unit 4, for example through the crediting module 41 of the central transaction unit 4, which is implemented e.g. as a programmed software module, this credit being credited to a corresponding account in the central transaction unit 4, for example, or achievable via the communication network 3 in a database of a financial institution. The crediting can also be accomplished, however, in the way described above via the financial institution or the clearing point.

As already mentioned in connection with the menu and function execution control for selection of the function "payment transaction," the software modules, in particular the transaction response module 13 and the payment record module 14 as well as software components of the authentication module 12 can be stored, for instance, on the SIM card 17 of the mobile device, e.g. as Java applet or as SIM Toolkit functions, and can also be executed on a processor of the SIM card 17, for instance. The software modules can moreover be achieved in such a way that they can be blocked by an authorized operator via the contactless device interface 11 or via the mobile radio network 6, for instance if the owner of the mobile device 1 has reported the loss of the respective mobile device 1 to a responsible operator.

As a final point, it should be added that the data transmissions via the contactless interface 21-11 can be encrypted, to increase security, according to a method known to one skilled in the art.

The payment transaction method according to the invention and the payment transaction system according to the invention make it possible for customers equipped with a mobile device 1 to carry out payment transactions without cash with their mobile devices 1 at a service point 5 equipped with one or more payment terminals 2. In so doing, a customer, after having authenticated himself at his mobile device 1, for example, needs only to type in the transaction identification for the respective payment transaction, e.g. when the mobile device 1 does not have any device interface available, or does not need to type any further data at all into the mobile device 1 if the payment terminal 2 is able to transmit the transaction identification directly to the mobile device 1 via a contactless device interface 21-11, depending upon the design of the mobile device 1. Such payment transactions from one or more service points 5 can be completed in a central transaction unit 4, the central transaction unit 4 being able to check the authenticity of participating payment transaction partners and the solvency of customers as well as carry out debits according to indications of the customers and credits for payment transactions.

LIST OF REFERENCE NUMERALS

1 mobile device
2 payment terminal
3 communication network
4 central transaction unit
5 service point (POS)
6 mobile radio network
11 receiver of a contactless device interface
12 authentication module
13 transaction response module
14 payment record module
15 memory means
16, 26 processor
17 SIM card
18 operating elements
19 display
21 transmitter of a contactless device interface
21-11 contactless device interface
22 transaction identification module
23 transaction placing module
24 communications module
29 display
41 crediting module
42 request for payment module
43 solvency checking module
44 transaction confirmation module
45 communications module
S1 transmission of the transaction identification and of the total transaction amount S1', S2 transmission of the transaction identification
S3 transmission of the request for payment
S4 transmission of the payment record
S5, S6 transmission of the transaction confirmation

The invention claimed is:

1. A payment transaction method between a customer with a mobile device and a service point, the method comprising:
    determining, at a payment terminal of the service point, a total transaction amount to be paid and a transaction identification assigned to the total transaction amount;
    transmitting the total transaction amount and the transaction identification to the mobile device;
    receiving, at the central transaction unit, the transaction identification from the mobile device via a communication network;
    transmitting, from the payment terminal to the central transaction unit, the total transaction amount and the transaction identification via the communication network;
    comparing, at the central transaction unit, the transaction identification received from the mobile device and the transaction identification received from the payment terminal;
    sending a payment request from the central transaction unit to the mobile device after the transaction identifications are compared, wherein the payment request includes the transaction identification and the total transaction amount; and
    receiving, at the central transaction unit, a payment record comprising the total transaction amount, the transaction identification and the mode of payment from the mobile device based on a selection of mode of payment by the customer.

2. The payment transaction method according to claim 1, wherein the payment record is prepared including a linking of the payment request for the customer comprising at least the total transaction amount to a customer identification for the customer, and the payment record is received at the central transaction unit from the mobile device via the communication network.

3. The payment transaction method according to claim 1, wherein, when determining the transaction identification, the payment terminal inserts a payment terminal identification, which payment terminal identification enables identification of a respective payment terminal from among a plurality of payment terminals present at the service point.

4. The payment transaction method according to claim 1, wherein, when determining the transaction identification, the payment terminal inserts a service point identification into the transaction identification, and the total transaction amount is credited to the service point identified through the service point identification.

5. The payment transaction method according to claim 1, wherein the customer accepts the transaction identification by operating elements of the mobile device after the transaction identification is received from the payment terminal via a contactless device interface.

6. The payment transaction method according to claim 1, wherein the customer authenticates himself/herself with a biometric feature at his/her mobile device before the transaction identification is transmitted to the central transaction unit.

7. The payment transaction method according to claim 1, wherein a solvency of the customer is checked at the central transaction unit.

8. A payment transaction system comprising:
    a central transaction unit operable to communicate with one or more mobile devices and one or more payment terminals in at least one service point via a communication network;
    wherein the one or more payment terminals is configured to:
        determine a total transaction amount to be paid and a transaction identification assigned to the total transaction amount,
        transmit the total transaction amount and the transaction identification to the central transaction unit, and
        transmit the total transaction amount and the transaction identification to the one or more mobile devices;
    wherein the central transaction unit is configured to:
        receive the total transaction amount and the transaction identification from the one or more mobile devices;
        compare the transaction identification received from the one or more mobile devices and the transaction identification received from the one or more payment terminals,
        after the transaction identifications are compared, transmit a payment request to the one or more mobile devices comprising the transaction identification and the total transaction amount; and
        receive a payment record from the one or more mobile devices,
        wherein the payment record comprises the total transaction amount, the transaction identification, and a mode of payment selected by the customer.

9. The system according to claim 8, wherein the payment request is received from the one or more mobile devices over the communication network by a payment record module in the one or more mobile devices configured to prepare the payment record including a linking of the received payment request for the customer associated a customer identification for the customer.

10. The system according to claim 8, wherein the one or more payment terminals each include a transaction identification module configured to determine in each case the transaction identification for the respective payment transaction and insert in each case a payment terminal identification for the respective payment terminal into the transaction identification.

11. The system according to claim 8, wherein the one or more payment terminals each include a transaction identification module configured to determine in each case the transaction identification for the respective payment transaction and insert in each case a service point identification into the transaction identification, and the central transaction unit includes a crediting module configured to credit the service point, identified through the service point identification, the total transaction amount for the respective payment transaction.

12. The system according to claim 8, wherein the one or more payment terminals each include at least one transmitter of a contactless device interface, the one or more mobile devices each include at least one receiver for the contactless device interface, by which contactless device interface the transaction identification for the respective payment transaction is transmitted from a respective payment terminal directly to a respective mobile device, and the transaction response module includes means for receiving an acceptance command entered by the respective customer by operating elements of the respective mobile device and for receiving the transaction identification for the respective payment transaction corresponding to the acceptance command.

13. The system according to claim 8, wherein the one or more mobile devices each comprise an authentication module for receiving at least one biometric feature from the customer and authenticating the customer based on the received biometric feature.

14. The system according to claim 8, wherein the central transaction unit includes a solvency checking module configured to check a solvency of the customer.

\* \* \* \* \*